United States

Giglia

[11] 3,973,829

[45] Aug. 10, 1976

[54] ELECTROCHROMIC DEVICES WITH PARTIALLY PRE-CHARGED COUNTERELECTRODES

[75] Inventor: Robert Domenico Giglia, Rye, N.Y.

[73] Assignee: American Cyanamid Company, Stamford, Conn.

[22] Filed: Sept. 3, 1974

[21] Appl. No.: 503,022

[52] U.S. Cl. ............................ 350/160 R; 252/62.2
[51] Int. Cl.² ..................... G02F 1/17; G02F 1/23
[58] Field of Search ............... 350/160 R; 252/62.2

[56] References Cited
UNITED STATES PATENTS 3,708,220   1/1973   Meyers et al. .................. 350/160 R
3,840,287   10/1974  Witzke et al. .................. 350/160 R

*Primary Examiner*—Robert J. Webster
*Attorney, Agent, or Firm*—Charles J. Fickey; Robert J. Feltovic

[57] ABSTRACT

An electrochromic data display and imaging device which may be formed by sandwich arrangement of the imaging area, the counter-electrode area with a suitable electrolyte layer between, the imaging area and/or counter-electrode area having greater uniformity of charge.

8 Claims, No Drawings

ELECTROCHROMIC DEVICES WITH PARTIALLY PRE-CHARGED COUNTERELECTRODES

BACKGROUND OF THE INVENTION

This invention relates to electro-optical devices whose electromagnetic radiation absorption characteristics can be selectively altered by influence of a suitably controlled electric field. More particularly, the invention is concerned with an electro-optical device which has a more uniform state of electrical charge at the imaging and/or counter-electrode areas. Still more particularly, this invention is directed to a sandwich type cell in which two layers of electrochromic material are separated by solid, semi-solid or liquid ion conducting media.

In U.S. Pat. Nos. 3,521,941, 3,578,843, 3,704,057 and 3,708,220, there are described electro-optical devices exhibiting a phenomenon known as persistent electrochromism wherein electromagnetic radiation absorption characteristic of a persistent electrochromic material is altered under the influence of an electric field. Such devices were employed in sandwich arrangement between two electrodes. Coloration was induced by charging the electrochromic film negative with respect to the counter-electrode, employing an external potential. The counter-electrode can be the same as the persistent electrochromic material or different.

By reversing the original polarity of the field or by applying a new field, it was also possible to cancel, erase or bleach the visible coloration.

The steps of color induction and erasure are defined as cycling.

It is an object of this invention to provide electrochromic imaging devices having more uniform operating characteristics.

SUMMARY OF THE INVENTION

The image display device is formed in a sandwich arrangement of an electrochromic layer as an imaging area and a counter-electrode with a spacing of an ion conducting medium, e.g. an electrolyte, between the areas. Means are provided for supplying electric current to the counter-electrode layer. Any conventional means is suitable. In the present invention, the state of charge on the electrochromic imaging layer or counter-electrode is made uniform by applying apropriate current at the time of manufacture to obtain a desired predetermined state of charge.

DETAILED DESCRIPTION OF INVENTION

As used herein, a "persistent electrochromic material" is defined as a material responsive to the application of an electric field of a given polarity to change from a first persistent state in which it is essentially non-absorptive of electromagnetic radiation in a given wavelength region, to a second persistent state in which it is absorptive of electromagnetic radiation in the given wavelength region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

Electrochromic Materials

The materials which form the electrochromic materials of the device in general are electrical insulators or semi-conductors. Thus are excluded those metals, metal alloys, and other metal-containing compounds which are relatively good electrical conductors, as described in U.S. Pat. No. 3,704,057.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like.

A particularly advantageous aspect of the present invention is the use of two separate layers of identical electrochromic materials one layer being employed as the counter-electrode for the other layer. A preferred embodiment consists of tungsten oxide as the electrochromic color electrode and tungsten oxide and graphite as the counter-electrode.

When the persistent electrochromic materials are employed as films, thickness desirably will be in the range of from about 0.1–100microns. However, since a small potential will provide an enormous field strength across very thin films, the latter, i.e., 0.1–10microns, are preferred over thicker ones. Optimum thickness will also be determined by the nature of the particular compound being laid down as a film and by the film-forming method since the particular compound and film-forming method may place physical (e.g., nonuniform film surface) and economic limitations on manufacture of the devices.

The electrochromic films may be laid down on any substrate which, relative to the film, is electrically conducting. The electrically conductive material is coated on a plastic or glass substrate, either transparent or translucent for the imaging area. For the counter-electrode area, the substrate may be plastic, glass or metal if desired. The electrode material may be carbon or the electrochromic material, or mixtures. If carbon is not present, the electrochromic material should be laid down on a conductive material previously deposited on the substrate, or on a conductive substrate such as a metal.

While tungsten oxide is employed as the electrochromic imaging material and an electric field is applied between the electrodes, a blue coloration of the previously transparent electrochromic layer occurs, i.e., the persistent electrochromic layer becomes absorptive of electromagnetic radiation over a band initially encompassing the red end of the visible spectrum, thereby rendering the imaging layer blue in appearance. Prior to the application of the electric field, the electrochromic imaging layer was essentially nonabsorbent and thus transparent.

Spacing Layer

A semi-solid ion conductive gel may be employed as disclosed in U.S. Pat. No. 3,708,220.

A preferrred embodiment employs $H_2SO_4$ in combination with polyvinyl alcohol.

A fluid layer containing an acid may also be used in place of the gel, as disclosed in U.S. Pat. No. 3,704,057 or a solid inorganic layer as disclosed in U.S. Pat. No. 3,521,941.

Counter-Electrode

As previously indicated, the counter-electrode may be any electrically conductive material. Particularly advantageous is a layer of electrochromic material, as described previously. It is also advantageous to use the same electrochromic material for the imaging area and counter-electrode. A mixture of graphite and an electrochromic material, or graphite alone may be used as the counter-electrode. Other metallic counter-electrodes are disclosed in U.S. Pat. No. 3,704,057.

Control of the state of charge of the electrochromic electrode and more importantly the counter-electrode at assembly has resulted in electrochromic devices which have more uniformly good switching speed and cycle life. Most notable is the narrowing in the range of switching characteristic from device to device which facilitates the use of simple, low cost integrated circuits to drive the electrochromic devices.

At a given applied voltage, the switching speed of an electrochromic device having electrochromic material in the counter-electrode is very dependent upon the proportion of colored to cleared electrochromic material in the counter-electrode. For example, a normal electrochromic numeric display counter-electrode may contain 5 to 10 times the weight of tungsten oxide as the electrochromic electrode. Tungsten oxide blued (charged) is several orders of magnitude more electronically conductive than tungsten oxide clear (uncharged). In order for the electrochromic electrode to color, it is important that there be tungsten oxide blued (charged) in the counter-electrode to provide a ready source of protons to facilitate the ionic process and to reduce resistive losses. Although a completely "blue" counter-electrode results in rapid coloring of the electrochromic electrode, it also results in very slow clearing speed. The counter-electrode should have a residual charge at all times to facilitate both electronic and ionic processes and the electrochromic electrode in turn should be the limiting electrode in terms of capacity.

Previous electrochromic devices required precise control of water content and evaporation step to establish adequate residual charge in the counter-electrode so as to result in uniform switching speed. Previously counter-electrodes could contain from 0 to 15% of the tungsten oxide in the blue state. The disclosed invention eliminates this problem and is a means of correcting unwanted conditions which can develop as a result of normal variations in manufacturing steps.

This invention relates to electrochemical methods of controlling the charge state of the electrochromic and/or counter-electrode. The electrochromic electrode or counter-electrode may be precharged before assembly into a working device by placing the electrode to be charged in a suitable electrolyte with a second electrode and applying a DC voltage, second electrode positive. Another method permits the charging to be accomplished during or after assembly of the electrohromic device. In this case a third electrode may be placed in contact with the electrolyte layer and a potential (DC) applied across the electrochromic electrode or the counter-electrode and the third electrode for a short period of time. Generally it is convenient to use the counter-electrode and the third electrode as the control need be less critical to avoid damage to the device. It is preferable to have about 50% of the counter-electrode electrochromic deposit in the blue state at time of manufacture.

Thus in the case of an image of one square centimeter of electrochromic film, the charge to color or erase is about 5 millicoulombs (mc.) The coulombic capacity of the counter-electrode should exceed the coulombic capacity of the imaging electrochromic area. For example, a 5 mc. capacity electrochromic image area should be matched with a 50 mc. electrochromic counter-electrode. The counter-electrode is charged by application of direct current to 25 to 30 mc. to obtain good overall performance in coloring and erasing.

I claim:

1. A variable light transmission device which comprises a persistent electrochromic material as a light modulating material, a counter-electrode, and an electrolyte material in contact with said light modulating material and said counter-electrode, wherein said counter-electrode includes electrochromic material in a substantially greater proportion than in said light modulating material and has a uniform predetermined partial electrical charge.

2. A variable light transmission device as in claim 1, which comprises three layers, one of electrochromic material, and the other of the counter-electrode separated by said electrolyte layer, said layers being disposed between a pair of conductive electrodes.

3. The device of claim 2, wherein said counter-electrode is the type of the persistent electrochromic material.

4. The device of claim 3, wherein the electrochromic materials in each said layer are identical.

5. The device of claim 3, wherein at least one of the electrodes is substantially transparent.

6. The device of claim 4, wherein said electrochromic materials are $WO_3$.

7. A device as in claim 1, wherein said electrolyte contains a gelling agent.

8. The device of claim 6, wherein the relative charge on the layers is such that when the light modulating layer is in the uncharged state, the counter-electrode layer has from about 40 to 80% of the electrochromic material in the charged state.

* * * * *